(12) United States Patent
Chang et al.

(10) Patent No.: US 8,462,607 B1
(45) Date of Patent: Jun. 11, 2013

(54) OPTICAL DISC WITH A DISCONTINUOUS SURFACE STRUCTURE

(71) Applicant: Ritek Corporation, Hsinchu (TW)

(72) Inventors: Shih-Mim Chang, Hsinchu County (TW); Shing-Tang Liao, Hsinchu County (TW); Chien-Chang Lu, Hsinchu County (TW)

(73) Assignee: Ritek Corporation, Hsinchu (TW)

( * ) Notice: Subject to any disclaimer, the term of this patent is extended or adjusted under 35 U.S.C. 154(b) by 0 days.

(21) Appl. No.: 13/759,747

(22) Filed: Feb. 5, 2013

Related U.S. Application Data

(63) Continuation-in-part of application No. 12/839,151, filed on Jul. 19, 2010, now abandoned.

(30) Foreign Application Priority Data

Apr. 9, 2010 (TW) ................................ 99206325 U

(51) Int. Cl.
*G11B 3/70* (2006.01)
*G11B 5/84* (2006.01)
*G11B 7/26* (2006.01)

(52) U.S. Cl.
USPC .......................................................... 369/277

(58) Field of Classification Search
USPC ................ 369/272.1, 273, 274, 275.1–275.5, 369/276–288, 289.1, 290.1, 291.1; 720/718
See application file for complete search history.

(56) References Cited

U.S. PATENT DOCUMENTS

2002/0114264 A1 8/2002 Kuchman
2006/0067202 A1 3/2006 Yashiro

*Primary Examiner* — Joseph Feild
*Assistant Examiner* — Gustavo Polo
(74) *Attorney, Agent, or Firm* — Muncy, Geissler, Olds & Lowe, PLLC

(57) ABSTRACT

Disclosed herein is an optical disc having an information area situated between an internal edge and an external edge of the optical disc. The optical disc includes a first substrate, a second substrate, a recording layer, a reflecting layer and a number of surface structures. The second substrate is disposed over the second substrate, the recording layer and the reflecting layer are disposed between the two substrates, and the reflecting layer is disposed between the first substrate and the recording layer. The surface structures are discontinuously disposed on the surface of the second substrate.

18 Claims, 10 Drawing Sheets

OPTICAL DISC WITH A DISCONTINUOUS SURFACE STRUCTURE

RELATED APPLICATIONS

This application is a continuation in part of Ser. No. 12/839,151, filed Jul. 19, 2010, which claims priority to Taiwan Application Serial Number 99206325, filed Apr. 9, 2010, the contents of each of which are herein incorporated by reference in their entireties.

BACKGROUND

1. Field

The present disclosure relates to a storage medium. More particularly, the present disclosure relates to an optical disc.

2. Description of Related Art

Optical storage media is in advantage of convenient storage of data, long keeping time, high compatibility, low probability of mistake in writing and reading, and high resistance to damage. Accordingly, the optical storage media has been widely used to make a backup copy and data reservation in business and home application.

However, optical discs are usually stored in a way that the optical discs are stacked up together. In this way, a printing side of one optical disc may directly contact with a reading side of another one. When a number of optical discs are stacked up, one optical disc may be pressured due to the gravity force of other optical discs disposed thereabove. As a result, the air that originally existed between two adjacent optical discs may be pushed out, and thereby forming a vacuum-liked condition between two adjacent optical discs. Therefore, the two adjacent optical discs are stuck with each other because of the absorption due to the vacuum-liked condition.

When a user grabs the optical discs, the stuck optical discs may lead to an inconvenient usage. Also, in the manufacturing procedure, the stuck optical discs increase the difficulty of grabbing the optical disc by a robot. In addition, when the optical discs are stuck together, the evaporated vapor, generated from the ink formed on the printing side of the optic disc, may disadvantageously influence the quality of the reading side of the adjacent optical disc. Especially, in recent years, the optical disc maker has developed a "printable optical disc" which allows users to print patterns on the surface of the optical disc by themselves. This type of printable optical discs typically has a smooth surface, and rendering the above-mentioned problem more serious.

SUMMARY

Therefore, according to one aspect of the present disclosure, an improved optical disc is provided to resolve the above-mentioned issue.

The optical disc has an internal edge, an external edge and an information area situated therebetween. The optical disc comprises a first substrate, a second substrate, a recording layer, a reflecting layer, and a surface structure. The second substrate is disposed above the first substrate. The recording layer is disposed between the first substrate and the second substrate. The reflecting layer is disposed between the first substrate and the recording layer. The surface structure is discontinuously disposed on the surface of the second substrate. The surface structure includes at least one first stripe-protrusion and at least one second stripe-protrusion. The first and second stripe-protrusions are formed on the surface of the second substrate. The first stripe-protrusion has a first stripe-body and a first tip portion extending from the first stripe-body in a direction parallel to the surface. The first tip portion has a width less than a width of the first stripe-body. The second stripe-protrusion has a second stripe-body, a first pincer portion and a second pincer portion. Both the first and second pincer portions extending from the second stripe-body in a direction parallel to the surface so that an indentation is formed between the first and second pincer portions. The first tip portion extends into the indentation between the first and second pincer portions and is not in contact with the first and second pincer portions such that a curved groove is formed between the first tip portion and the first and second pincer portions.

According to one embodiment of the present disclosure, the first tip portion overlaps both the first and second pincer portions when viewed in a radial direction of the optical disc.

According to one embodiment of the present disclosure, the optical disc has a radius passing through the first pincer portion, the second pincer portion and the first tip portion.

According to one embodiment of the present disclosure, the first pincer portion and the second pincer portion respectively have a first out edge and a second out edge, and the first out edge is substantially parallel with the second out edge.

According to one embodiment of the present disclosure, the second stripe-body has a width that substantially equals the width of the first stripe-body.

According to one embodiment of the present disclosure, the first pincer portion and the second pincer portion respectively have a first out edge and a second out edge, and a distance between the first out edge and the second out edge is substantially equal to a width of the second stripe-body.

According to one embodiment of the present disclosure, the first pincer portion and the second pincer portion respectively have a first out edge and a second out edge, and a distance between the first out edge and the second out edge is substantially equal to a width of the first stripe-body.

According to one embodiment of the present disclosure, the first stripe-body has a first end and a second end opposite thereto, and the first tip portion is extended from the first end. The first stripe-protrusion further includes a third pincer portion and a fourth pincer portion both extended from the second end.

According to one embodiment of the present disclosure, the second stripe-body has a third end and a fourth end opposite thereto, and the first and second pincer portions are extended from the third end. The second stripe-protrusion further includes a second tip portion extended from the fourth end.

According to one embodiment of the present disclosure, the first stripe-body has a first end and a second end opposite thereto, and the first tip portion is extended from the first end. The first stripe-protrusion further includes a second tip portion extended from the second end.

According to one embodiment of the present disclosure, the second stripe-body has a third end and a fourth end opposite thereto, and the first and second pincer portions are extended from the third end. The second stripe-protrusion further comprises a third pincer portion and a fourth pincer portion both extended from the fourth end.

According to one embodiment of the present disclosure, the information area has an inner boundary and an outer boundary, and the plurality of the surface structures are positioned between the internal edge and the inner boundary.

According to another embodiment of the present disclosure, the information area has an inner boundary and an outer boundary, and the plurality of the surface structures are positioned between the outer boundary and the external edge.

According to still another embodiment of the present disclosure, the information area has an inner boundary and an outer boundary, and the plurality of the surface structures are positioned between the internal edge and the inner boundary, and between the outer boundary and the external edge.

According to one embodiment of the present disclosure, each of the first stripe-protrusion and the second stripe-protrusion extends along a circumferential direction of the optical disc.

According to one embodiment of the present disclosure, each of the first stripe-protrusion and the second stripe-protrusion protrudes from the surface of the second substrate, and has a height of about 70 μm.

According to one embodiment of the present disclosure, the recording layer comprises a material selected from the group consisting of cyanine dye, azo dye, squarylium dye, formazan dye, and a combination thereof.

According to one embodiment of the present disclosure, the recording layer comprises a material selected from the group consisting of Si, Sn, Al, Ag, Au, Ti, Ni, Cu, Co, Ta, Fe, W, Cr, V, Ga, Pb, Mo, Sb, In, Bi, Zn and a combination thereof.

The optical disc according to one embodiment of present disclosure, the surface structures disposed on the second substrate may prevent the optical disc from sticking with each other. Moreover, the optical disc has a simple structure and is cost-effective.

BRIEF DESCRIPTION OF THE DRAWINGS

The invention can be more fully understood by reading the following detailed description of the embodiments, with reference made to the accompanying drawings as follows.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

According to embodiments of the present disclosure, a number of surface structures are employed to prevent the vacuum-liked condition, and thereby resolving the sticking problem occurred between two optic discs.

Figure 1:
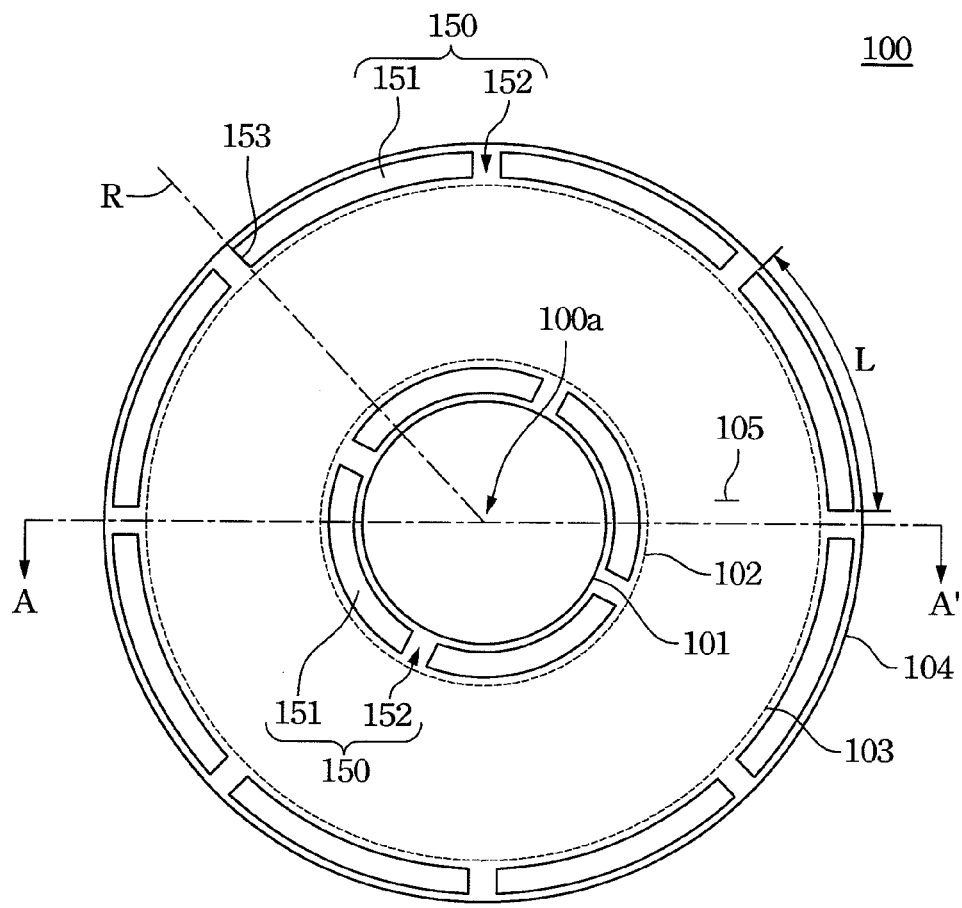
FIG. 1 is a top view schematically illustrating an optical disc according to one embodiment of the present disclosure.

FIG. 1 is a top view schematically illustrating an optical disc according to one embodiment of the present disclosure. Referring to FIG. 1, optical disc 100 includes a central hole 100a, an internal edge 101 and an external edge 104. The internal edge 101 of the optical disc 100 surrounds the central hole 100a. The external edge 104 is the outer periphery of the optical disc 100. In practice, the diameter of the central hole and the diameter and thickness of the optical disc may satisfy the standard of audio compact disc, digital versatile disc (DVD), Blu-Ray® disc or other optical storage media. In addition, the optical disc 100 may be a write once recordable compact disc or a rewritable compact disc, and the present disclosure is not limited thereto.

Specifically, the optical disc 100 has an information area 105, which is an annular region for reading or writing data. The information area 105 is situated between the internal edge 101 and the external edge 104. More specifically, the information area 105 has an inner boundary 102 and an outer boundary 103. The inner boundary 102 is in the vicinity of the internal edge 101, while the outer boundary 103 is in the vicinity of the external edge 104.

Figure 2:
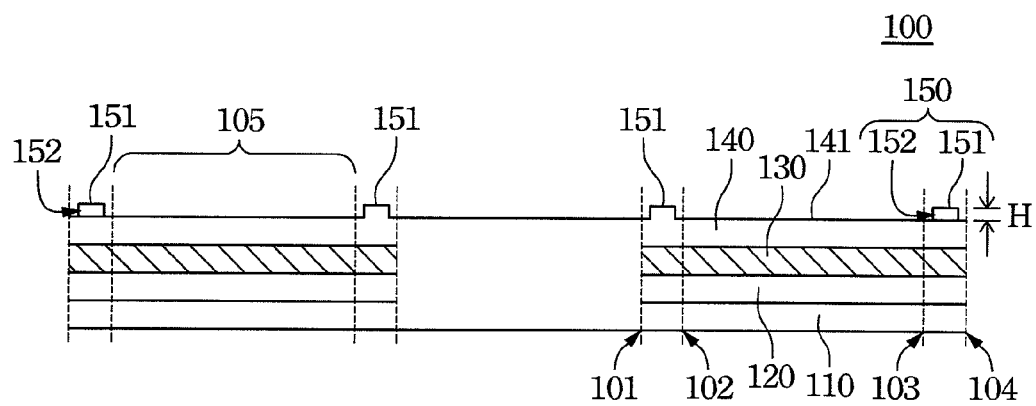
FIG. 2 is a cross-sectional view along line A-A' in FIG. 1.

FIG. 2 is a cross-sectional view along line A-A' in FIG. 1. Referring to FIG. 1 and FIG. 2, optical disc 100 includes a first substrate 110, a second substrate 140, a recording layer 120, a reflecting layer 130, and a plurality of surface structures 150. The second substrate 140 is disposed above the first substrate 110, and is substantially parallel to the first substrate 110. Both the recording layer 120 and the reflecting layer 130 are disposed between the first substrate 110 and the second substrate 140. The reflecting layer 130 is located between the recording layer 120 and the second substrate 140. The surface structures 150 are disposed on the surface 141 of the second substrate 140. The surface 141 is a non-reading side of the optical disc 100. The surface structures 150 are discontinuously disposed on the surface 141 of the second substrate 140, such that air may flow to the external edge 104 from the internal edge 101 through the space existing between these surface structures 150. That is, air may flow between the inner side (i.e. within the central hole 100a) and the outer side (i.e. out of the external edge 104), and the sticking problem that occurred between two adjacent optical discs due to the vacuum absorption may be prevented.

In some embodiments, the first substrate 110 may be made of polycarbonate, polymethylmethacrylate, or other material that may prevent moisture and oxygen from penetration. The second substrate 140 may also be made of polycarbonate, polymethylmethacrylate, or other material that may prevent moisture and oxygen from penetration. In one example, the surface structures 150 may be integrally formed on the second substrate 140. It is to be noted that the material of the first substrate 110 may be the same as or different from the second substrate 140, depending on the desire of the product. In practice, the recording layer 120 may be made from an organic recording material such as cyanine dye, azo dye, squarylium dye, formazan dye, and a combination thereof, and any other dye known in the art. The reflecting layer 130 may be made of silver, gold, aluminum, titanium, lead, chromium, molybdenum, tungsten, tantalum, or a combination thereof. In another example, the recording layer 120 may be made from an inorganic recording material selected from the group consisting of Si, Sn, Al, Ag, Au, Ti, Ni, Cu, Co, Ta, Fe, W, Cr, V, Ga, Pb, Mo, Sb, In, Bi, Zn and a combination thereof.

The optical disc 100 may further comprise other material layers although the embodiments described above are composed of a first substrate, a second substrate, a recording layer and a reflecting layer. For example, the optical disc may comprise a first substrate, a second substrate, a dielectric layer, an interface layer, a recording layer and a reflecting layer. The dielectric layer may be made of a material selected from the group consisting of silicon nitride, zinc sulfide—silicon dioxide, aluminium nitride, silit, nitrided germanium, titanium nitrides, tantalum oxide, yttrium oxide and a combination thereof. In addition, the optical disc disclosed herein may be applied in a relatively derived optical disc such as a digital versatile disc-dual layer (DVD-DL), a blu-ray disc-dual layer (BD DL) and a multiple-layered BD.

Figure 3:
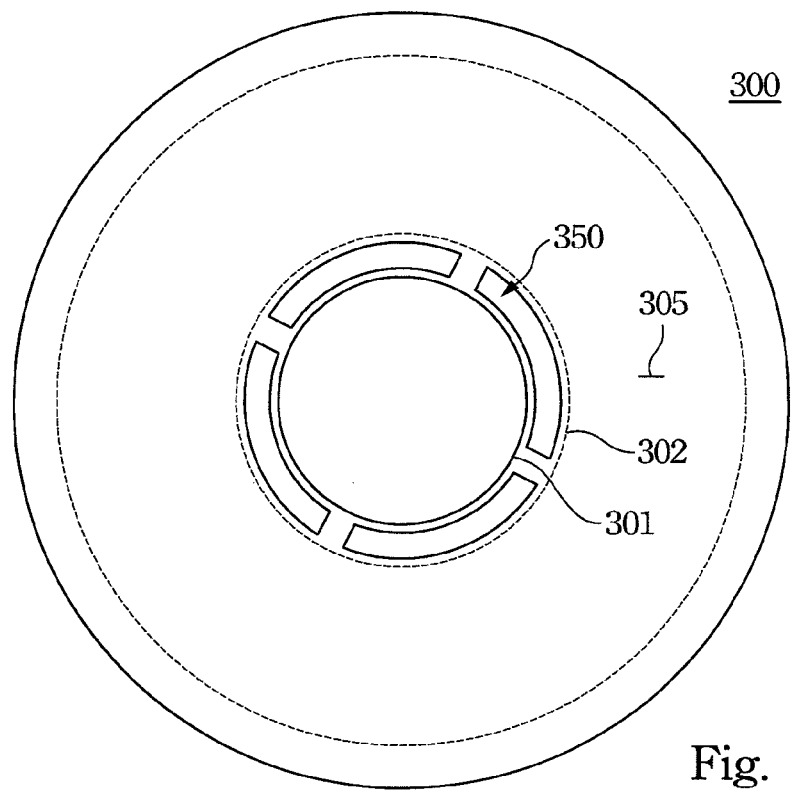
FIG. 3 is a top view schematically illustrating an optical disc according to another embodiment of the present disclosure.
Figure 4:
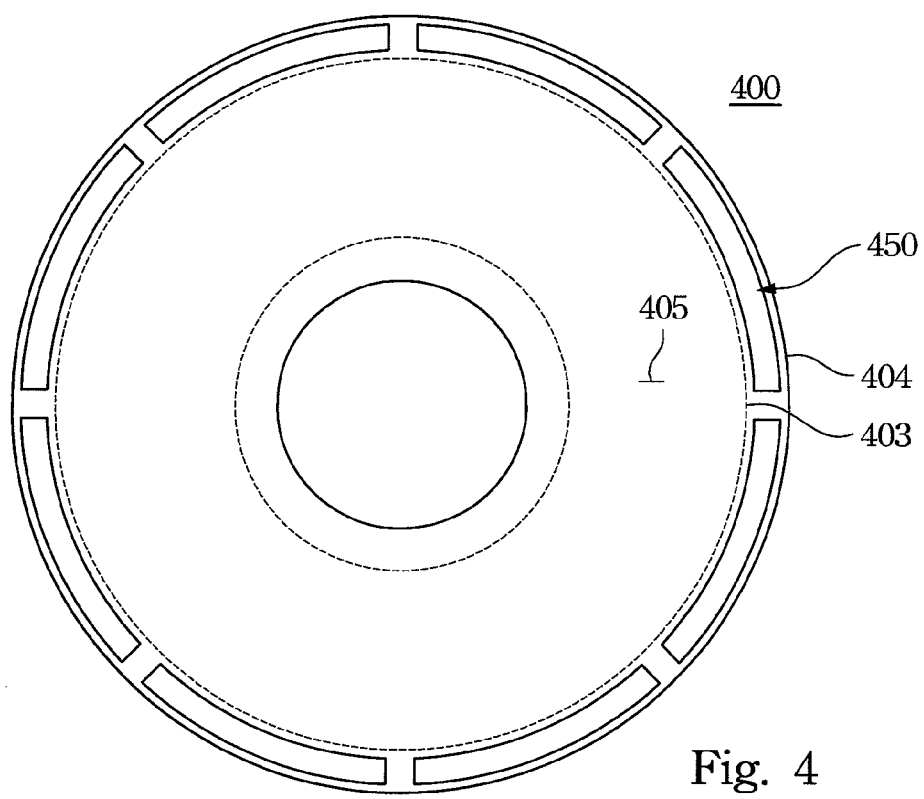
FIG. 4 is a top view schematically illustrating an optical disc according to still another embodiment of the present disclosure.

In one embodiment, the surface structures 150 of the optical disc 100 are discontinuously disposed on the surface 141 of the second substrate 140 where is out of the information area 105. Specifically, the surface structures 150 are disposed between the internal edge 101 and the inner boundary 102, and also disposed between the outer boundary 103 and the external edge 104, as illustrated in FIG. 1 and FIG. 2. However, the arrangement of the surface structures 150 is not limited to the embodiment described above. Referring to FIG. 3 and FIG. 4, FIG. 3 depicts that the surface structures 350 only exist in the vicinity of the internal edge 301. FIG. 4 depicts that the surface structures 450 only exist in the vicinity of the external edge 404. More specifically, the surface structures 350 depicted in FIG. 3 are disposed in the area that is adjacent to the internal edge 301 of the optical disc 300. That is, the surface structures 350 are disposed in the area between the internal edge 301 of the optical disc 300 and the inner boundary 302 of the information area 305. The surface structures 450 depicted in FIG. 4 are disposed in the area that is adjacent to the external edge 404 of the optical disc 400. That is, the surface structure 450 is disposed in the area between the outer boundary 403 of the information area 405 and the external edge 404 of the optical disc 400.

The present disclosure is not limited to that the surface structures 150 are discontinuously disposed on the area where is out of the information area 105. In one embodiment, the surface structures 150 may extend from a position out of the information area 105 to another position within the information area 105. Any other type of discontinuous arrangements of the surface structures 150, disposed on the surface 141 of the second substrate 140, may be applied in the present disclosure so long as air may flow between the inner side and the outer side of the optical disc 100 and prevent the sticking problem occurred between two optical discs.

Referring back to FIG. 1, the surface structures 150 includes a plurality of bumps 151, and a groove 152 is formed between two adjacent bumps 151. In this example, each of the bumps 151 substantially has a stripe shape, and the bump 151 extends along a circumferential direction of the optical disc, and thereby having a length L. In addition, each of the bumps positioned on the same circumferential direction has the same length. However, in some examples, each of the bumps may have a different length L, depending on the desire of the product.

In one specific example, each of the bumps 151 protrudes a height H from the surface 141 of the second substrate 140. The height H is about 70 μm, so that a robot would not be influenced by the bumps 151 when it grabs the optical disc 100 in the manufacturing procedure. Also, the bumps 151 would not influence the storage of the optical disc 100 in a disc box.

Figure 5:
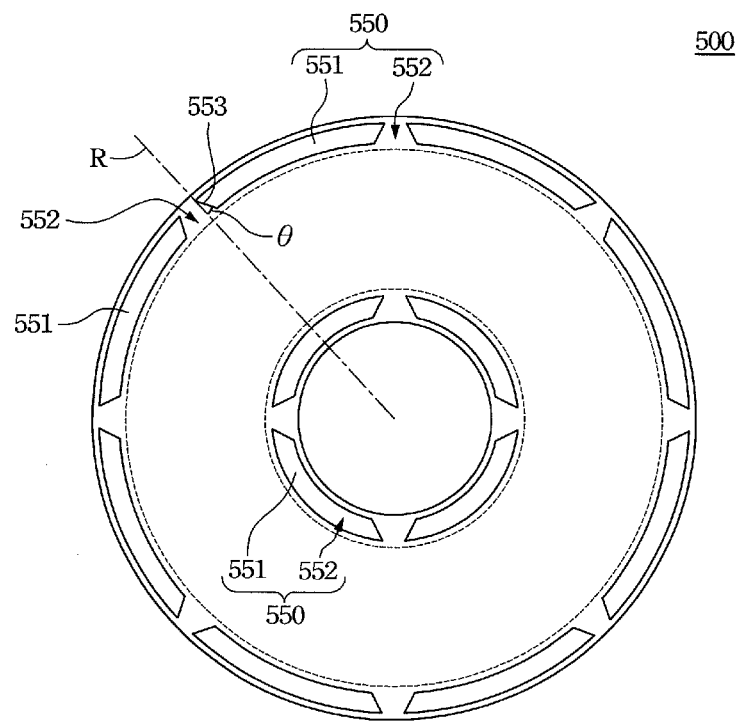
FIG. 5 is a top view schematically illustrating an optical disc according to another embodiment of the present disclosure.

Moreover, each of the bumps 151 at least comprises a side edge 153 which faces the adjacent groove 152. The side edge 153 substantially extends on a radial direction R of the optical disc. In this way, the groove 152 extends on the radial direction R of the optical disc as well. However, the design of the bumps 151 is not limited on the way as described above. FIG. 5 is a top view schematically illustrating a different design of the bumps. Referring to FIG. 5, the optical disc 500 includes a plurality of bumps 551, and a groove 552 is formed between two adjacent bumps 551. Each of the bumps 151 includes a side edge 553 which faces the adjacent groove 552. The side edge 553 extends on a direction that forms a non-right angle θ with a radial direction of the optical disc, so that the two side of the groove 552 are not in parallel.

Figure 6:
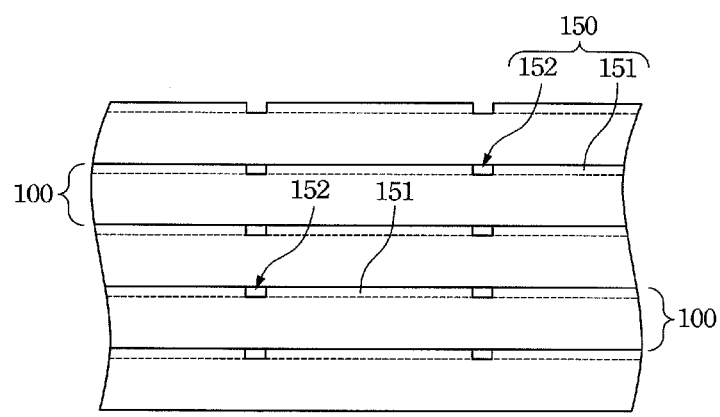
FIG. 6 schematically illustrates the condition of stacking up a number of the optical disc according to one embodiment of the present disclosure.

FIG. 6 schematically illustrates the situation of stacking up a number of the optical disc described in FIG. 1. The surface structure 150 of the optical disc 100 may include the bumps 151 discontinuously arranged and a number of grooves 152. When the optical discs 100 are stacked up, each optical disc 100 contacts with the next one by the bump 151. Air may flow between the inner side and the outer side of the optical disc 100 through the groove 152, so that the sticking problem occurred between two optical discs 100 may be prevented.

Figure 7:
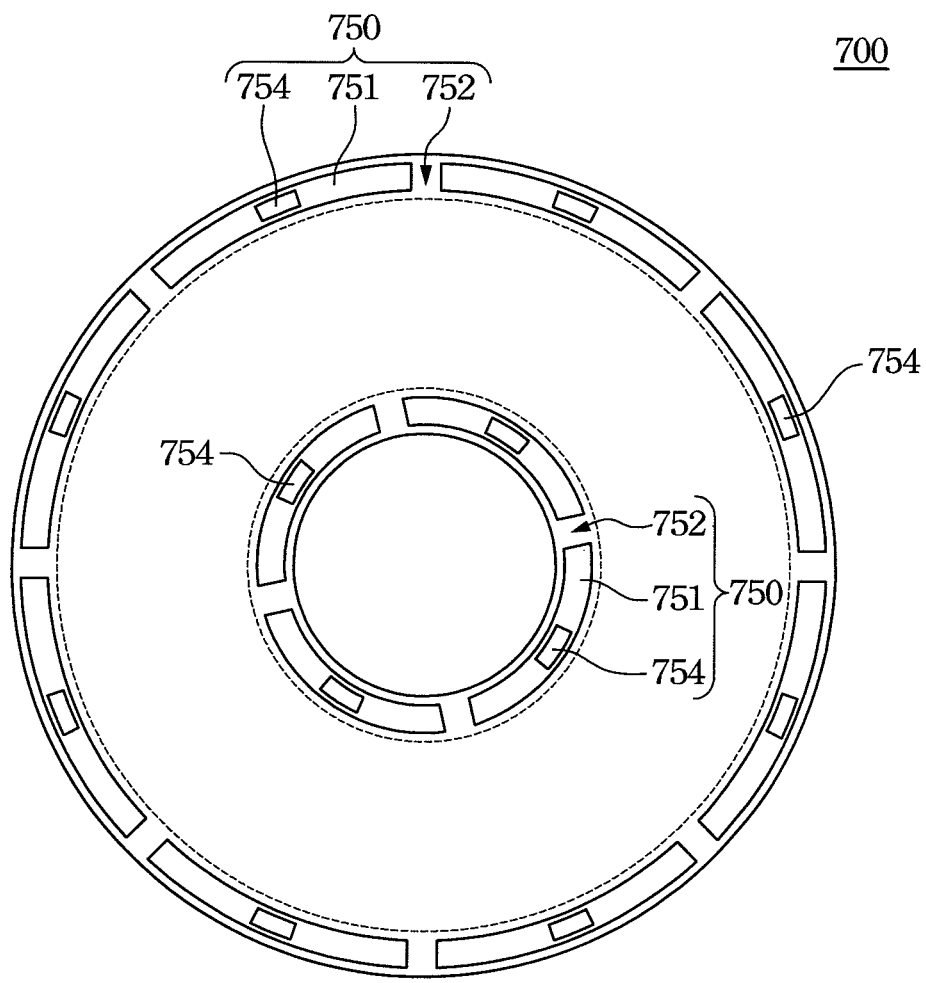
FIG. 7 is a top view schematically illustrating an optical disc according to another embodiment of the present disclosure.

The surface structure 150 of the optical disc 100 may comprise a plurality of bumps, which are discontinuously arranged, so as to form a first profile on the surface structure. In one example, the surface structure 150 may further comprise a plurality of sub-bump to complicate the profile of the surface structure 150. FIG. 7 is a top view schematically illustrating an optical disc 700 having a plurality of sub-bumps. Referring to FIG. 7, the surface structure 750 comprises a plurality of bumps 751 and a plurality of sub-bumps 754. The sub-bumps 754 are disposed on and protrude from the bumps 751. For example, a single sub-bump 754 may be disposed on a single bump 751. Alternatively, a number of sub-bump 754 may be disposed on a single bump 751. In this way, the surface structure 750 may have a second profile, which is more complex than the first profile as depicted in FIG. 1. As a result, the sticking problem occurred between two optical discs 700, when stacking up together, may be prevented because the vacuum absorption between two optical discs 700 would not occur.

Figure 8:
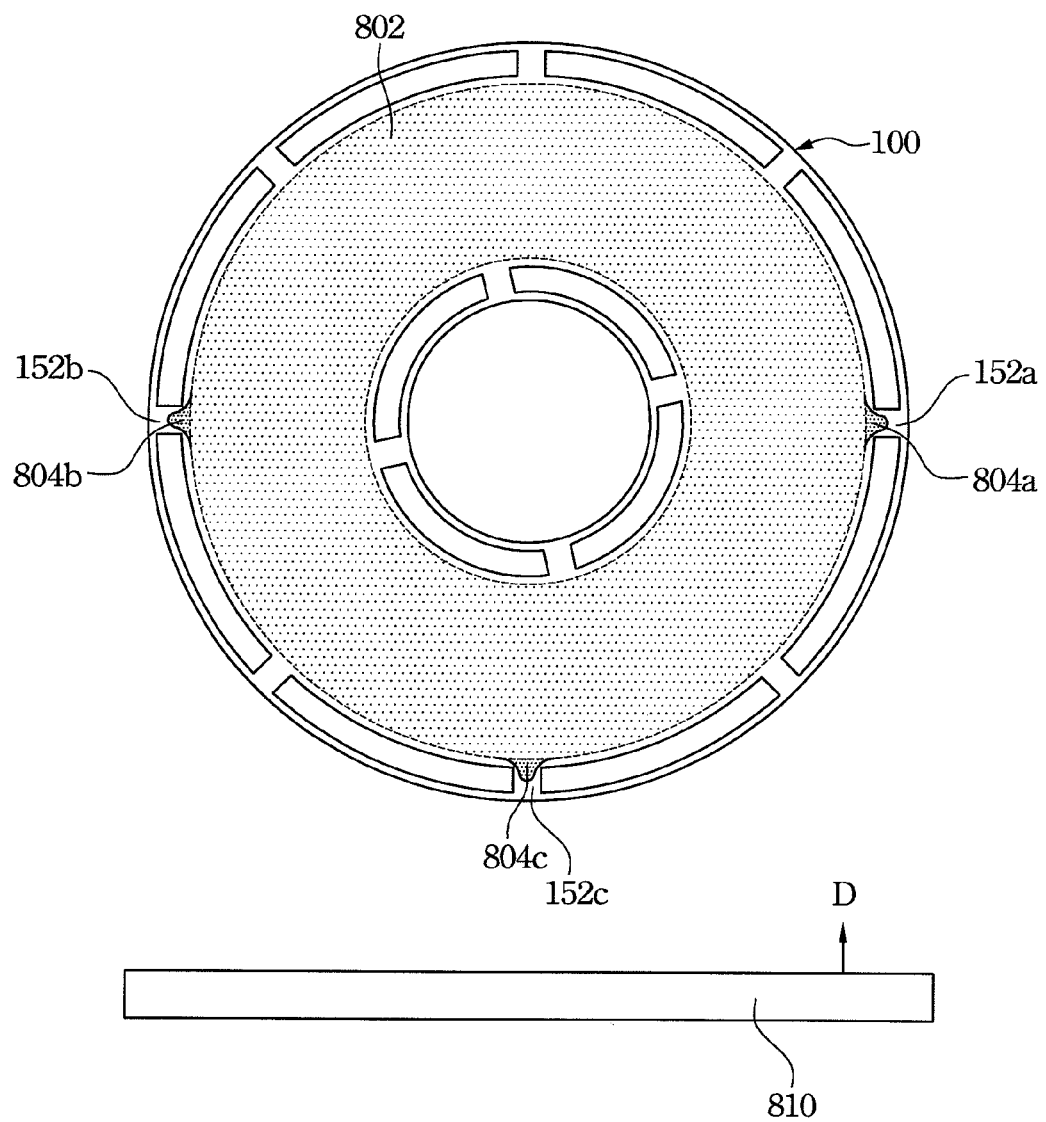
FIG. 8 is shows an optical disc in a screen printing process.

In one embodiment, ink is printed on the surface 141 of the second substrate 140 for the purpose of exhibiting colors or certain information, as shown in FIG. 8. In general, a screen-printing process is employed to print the ink on the disc. In this embodiment, however, a problem is possibly occurred in the screen-printing process. Particularly, it is desirable to print ink in the ring-shaped area 802 on the optical disk 100. When a squeegee 810 is moved across over the optical disk 100 in the direction D, ink is printed on the ring-shaped area 802. However, a little ink 804a, 804b overflows past the boundary of the ring-shaped area 802 at positions adjacent to the grooves 152a, 152b, which are parallel with the squeegee 810. In addition, a little ink 804c also overflows past the desired boundary at a position adjacent to the groove 152c, which is the starting point of the screen-printing. As a result, the optical disk 100 suffers poor printing quality because a rough printing verge is formed thereon.

Figure 9:
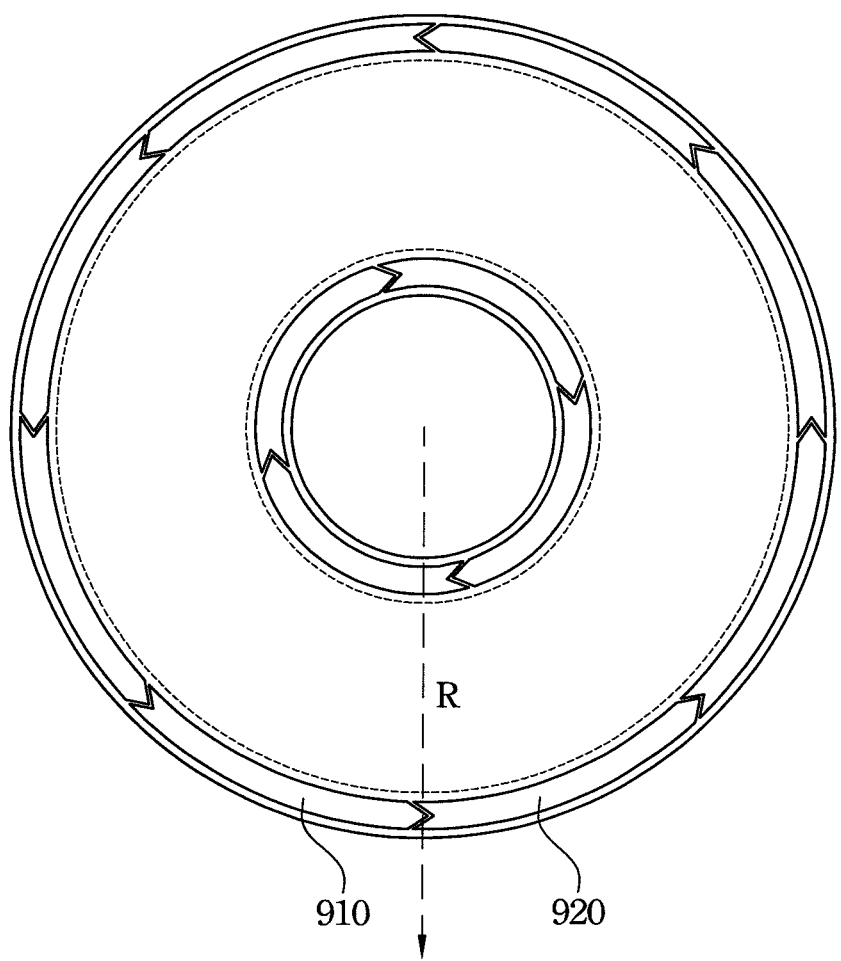
FIG. 9 is top view schematically illustrating an optical disc according to another embodiment of the present disclosure.

FIG. 9 is top view schematically illustrating an optical disc 900 according to another embodiment of the present disclosure. The optical disc 900 may resolve the problem described above. The optical disc 900 is similar to the optical disc 100 in structure, except that the surface structure of this embodiment is different from that in the optical disc 100. The cross-sectional view of the optical disc 900 is similar to that depicted in FIG. 2. In this embodiment, the surface structure includes at least one first stripe-protrusion 910 and at least one second stripe-protrusion 920, as illustrated in FIG. 9. Both of the first stripe-protrusion 910 and the stripe-protrusion 920 are formed on the surface 141 of the second substrate 140.

Figure 10A:
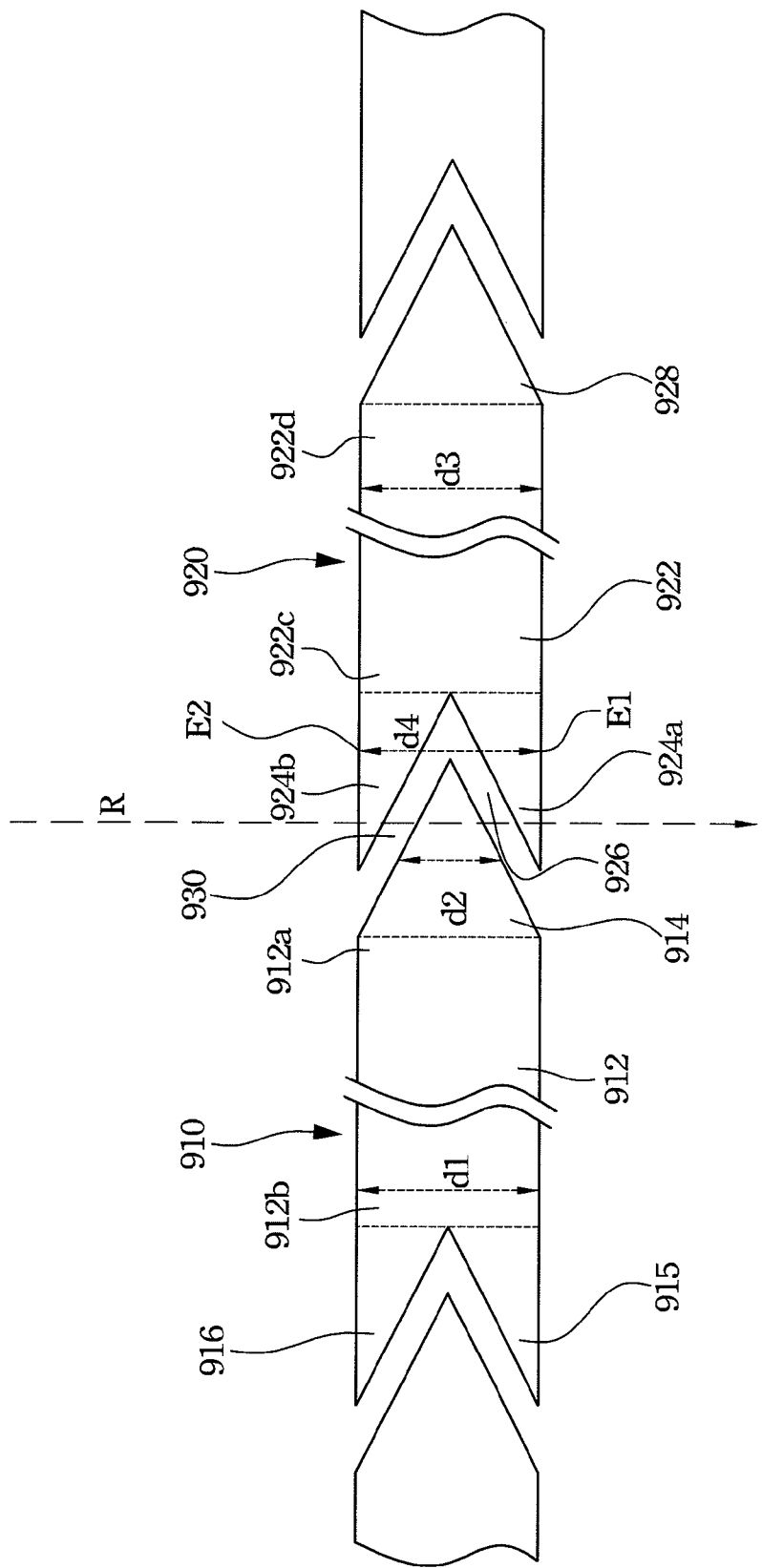
FIGS. 10A-10D are an enlarged views schematically depicting the first stripe-protrusion and the second stripe-protrusion in detail according to embodiments of the present disclosure.

FIG. 10A is an enlarged view schematically depicting the first stripe-protrusion 910 and the second stripe-protrusion 920 in detail according to one embodiment of the present disclosure. The first stripe-protrusion 910 has a first stripe-body 912 and a first tip portion 914. The first tip portion 914 is extended from the first stripe-body 912 in a direction parallel to the surface 141. The first tip portion 914 has a width d2 that is less than the width d1 of the first stripe-body 912.

The second stripe-protrusion 920 has a second stripe-body 922, a first pincer portion 924a and a second pincer portion 924b. Both the first and second pincer portions 924a, 924b are extend from the second stripe-body 922 in a direction parallel to the surface 141 such that an indentation 926 is formed between the first and second pincer portions 924a, 924b. The first tip portion 914 of the first stripe-protrusion 910 is extended into the indentation 926 between the first and second pincer portions 924a, 924b. It is noted that the first tip portion 914 is not in contact with the first and second pincer portions 924a, 924b such that a curved groove 930 is formed between the second stripe-protrusion 920 and the first stripe-protrusion 910, more specifically between the first tip portion 914 and each of the first and second pincer portions 924a, 924b.

When viewing in a radial direction R of the optical disc 900, the first tip portion 914 overlaps both of the first and second pincer portions 924a, 924b, as illustrated in FIG. 9 and FIG. 10A. That is, a radius of the optical disc 900 passes through the first pincer portion 924a, the second pincer portion 924b and the first tip portion 914. In other words, the curved groove 930 crosses through the radius form one side to the other side, and further returns to the original side of the radius from the other side of the radius. For example, the curved groove 930 may be formed in V-shape, inverse V-shape, U-shape or inverse U-shape.

With reference to FIG. 10A, when the squeegee 810 is parallel to the direction R and is moved across over the curved groove 930 between the first and second stripe-protrusion 910, 920, the first and second pincer portions 924a, 924b as well as the first tip portion 914 support the squeegee 810 such that the squeegee 810 is smoothly moved across the groove 930. Significantly, the problem of the ink overflow described above may be resolved.

In one embodiment, the first pincer portion 924a and the second pincer portion 924b respectively have a first out edge E1 and a second out edge E2. The first out edge E1 of the first pincer portion 924a is substantially parallel to the second out edge E2 of the second pincer portion 924b. Furthermore, the width d3 of the second stripe-body 922 is substantially equal to the width d1 of the first stripe-body 912. In one example, the distance d4 between the first out edge E1 and the second out edge E2 is substantially equal to either the width d3 of the second stripe-body 922 or the width d1 of the first stripe-body 912.

In another embodiment, the first stripe-protrusion 910 further comprises a third pincer portion 915 and a fourth pincer portion 916, as depicted in FIG. 10A. In particular, the first stripe-body 912 has a first end 912a and a second end 912b opposite thereto. The first tip portion 914 is extended from the first end 912a, whereas both of the third pincer portion 915 and the fourth pincer portion 916 are extended from the second end 912b. In one example, the second stripe-protrusion 920 further includes a second tip portion 928. Specifically, the second stripe-body 922 has a third end 922c and a fourth end 922d opposite thereto. The first and second pincer portions 924a, 924b are extended from the third end 922c, whereas the second tip portion 928 is extended from the fourth end 922d.

Figure 10B:
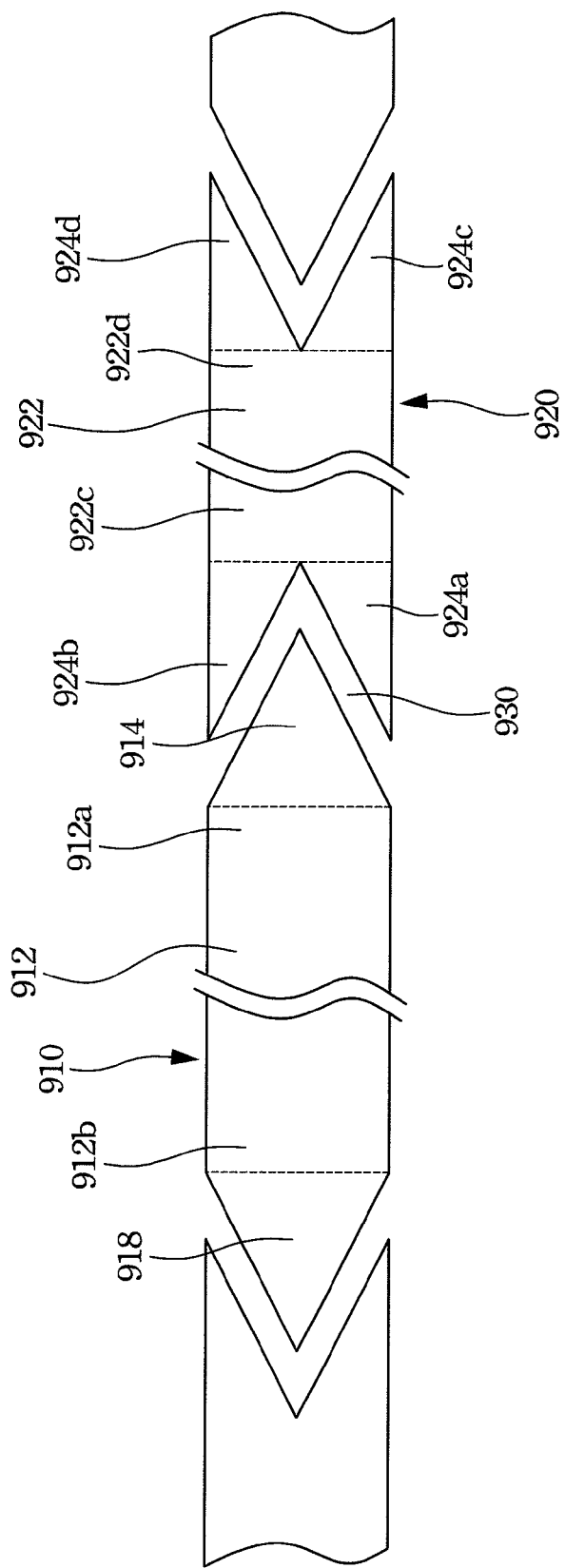

In still another embodiment, as depicted in FIG. 10B, the first stripe-protrusion 910 may comprise a first tip portion 914 and a second tip portion 918. The first tip portion 914 is extended from the first end 912a of the first stripe-body 912, whereas the second tip portion 918 is extended from the second end 912b of the first stripe-body 912. In addition, the second stripe-protrusion 920 may include a first pincer portion 924a, a second pincer portion 924b, a third pincer portion 924c and a fourth pincer portion 924d. The first and second pincer portions 924a, 924b are extended from the third end 922c of the second stripe-protrusion 920, whereas the third and fourth pincer portion 924c, 924d are extended from the fourth end 922d of the second stripe-protrusion 920.

Figure 10C:
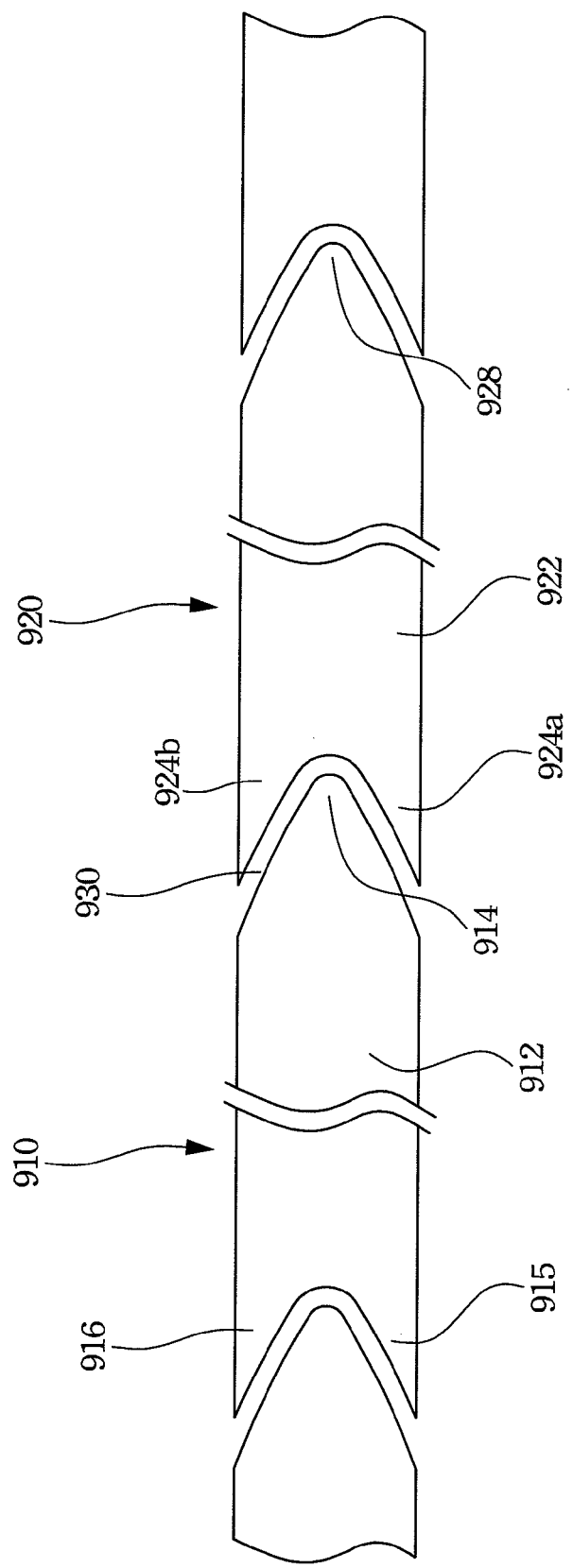
Figure 10D:
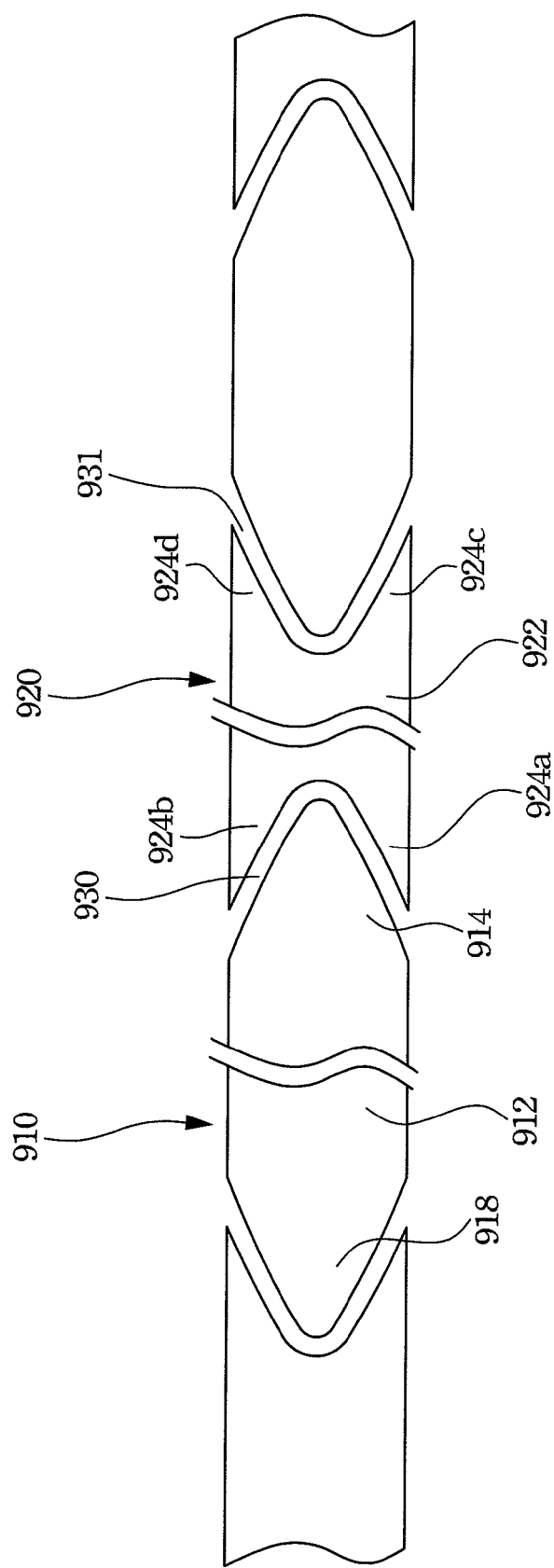

The groove 930 may be formed in other shape although hereinbefore the groove 930 is illustrated in V-shape. FIG. 10C is a top view schematically illustrating a first stripe-protrusion 910 and a second stripe-protrusion 920 according to another example of the present disclosure. In this example, the groove 930 is formed in U-shape, and other features of the first and second stripe-protrusion 910, 920 may be the same as these described hereinbefore in connection with FIG. 10A. In addition, FIG. 10D is a top view schematically illustrating a first stripe-protrusion 910 and a second stripe-protrusion 920 according to still another example of the present disclosure. In this example, the groove 930 is formed in U-shape, but the groove 931 is formed in inverse U-shape.

The optical disc disclosed herein having a surface structure, which is discontinuously disposed thereon, allows air to flow between the inner side and the outer side of the optical disc. It possesses the advantage of having a simple structure, and is cost-effective. In addition, when optical discs are stuck up together, the vacuum absorption occurred in the prior art may be prevented, and thereby resolving the sticking problem occurred between optical discs, and then the efficiency of equipment in the manufacturing process may be increased. Moreover, according to the embodiments of the present disclosure, the issue of the evaporated vapor, which disadvantageously influences the optical disc, may also be improved.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An optical disc having an internal edge, an external edge and an information area situated therebetween, the optical disc comprising
a first substrate;
a second substrate disposed above the first substrate;
a recording layer disposed between the first substrate and the second substrate;
a reflecting layer disposed between the first substrate and the recording layer; and
a surface structure discontinuously disposed on a surface of the second substrate, the surface structures comprising:
at least one first stripe-protrusion formed on the surface, the first stripe-protrusion having a first stripe-body and a first tip portion extending from the first stripe-body in a direction parallel to the surface, the first tip portion having a width less than a width of the first stripe-body; and at least one second stripe-protrusion formed on the surface, the second stripe-protrusion having a second stripe-body, a first pincer portion and a second pincer portion, both the first and second pincer portions extending from the second stripe-body in a direction parallel to the surface so that an indentation being formed between the first and second pincer portions, wherein the first tip portion extends into the indentation between the first and second pincer portions and is not in contact with the first and second pincer portions such that a curved groove is formed between the first tip portion and the first and second pincer portions.

2. The optical disc according to claim 1, wherein the first tip portion overlaps both the first and second pincer portions when viewed in a radial direction of the optical disc.

3. The optical disc according to claim 1, wherein the optical disc has a radius passing through the first pincer portion, the second pincer portion and the first tip portion.

4. The optical disc according to claim 1, wherein the first pincer portion and the second pincer portion respectively have a first out edge and a second out edge, and the first out edge is substantially parallel with the second out edge.

5. The optical disc according to claim 1, wherein the second stripe-body has a width that substantially equals the width of the first stripe-body.

6. The optical disc according to claim 1, wherein the first pincer portion and the second pincer portion respectively have a first out edge and a second out edge, and a distance between the first out edge and the second out edge is substantially equal to a width of the second stripe-body.

7. The optical disc according to claim 1, wherein the first pincer portion and the second pincer portion respectively have a first out edge and a second out edge, and a distance between the first out edge and the second out edge is substantially equal to a width of the first stripe-body.

8. The optical disc according to claim 1, wherein the first stripe-body has a first end and a second end opposite thereto, and the first tip portion is extended from the first end, and wherein the first stripe-protrusion further comprises a third pincer portion and a fourth pincer portion both extended from the second end.

9. The optical disc according to claim 1, wherein the second stripe-body has a third end and a fourth end opposite thereto, and the first and second pincer portions are extended from the third end, and wherein the second stripe-protrusion further comprises a second tip portion extended from the fourth end.

10. The optical disc according to claim 1, the first stripe-body has a first end and a second end opposite thereto, and the first tip portion is extended from the first end, and wherein the first stripe-protrusion further comprises a second tip portion extended from the second end.

11. The optical disc according to claim 1, the second stripe-body has a third end and a fourth end opposite thereto, and the first and second pincer portions are extended from the third end, and wherein the second stripe-protrusion further comprises a third pincer portion and a fourth pincer portion both extended from the fourth end.

12. The optical disc according to claim 1, wherein the information area has an inner boundary and an outer boundary, and the plurality of the surface structures are positioned between the internal edge and the inner boundary.

13. The optical disc according to claim 1, wherein the information area has an inner boundary and an outer boundary, and the plurality of the surface structures are positioned between the outer boundary and the external edge.

14. The optical disc according to claim 1, wherein the information area has an inner boundary and an outer boundary, and the plurality of the surface structures are positioned between the internal edge and the inner boundary, and positioned between the outer boundary and the external edge.

15. The optical disc according to claim 1, wherein each of the first stripe-protrusion and the second stripe-protrusion extend along a circumferential direction of the optical disc.

16. The optical disc according to claim 1, wherein each of the first stripe-protrusion and the second stripe-protrusion protrudes from the surface of the second substrate, and has a height of about 70 μm.

17. The optical disc according to claim 1, wherein the recording layer comprises a material selected from the group consisting of cyanine dye, azo dye, squarylium dye, formazan dye, and a combination thereof.

18. The optical disc according to claim 1, wherein the recording layer comprises a material selected from the group consisting of Si, Sn, Al, Ag, Au, Ti, Ni, Cu, Co, Ta, Fe, W, Cr, V, Ga, Pb, Mo, Sb, In, Bi, Zn and a combination thereof.

* * * * *